| United States Patent [19] | [11] | 4,242,294 |
|---|---|---|
| Hüther et al. | [45] | Dec. 30, 1980 |

[54] METHOD FOR ENCAPSULATING A MOLDED CERAMIC MEMBER

[75] Inventors: Werner Hüther, Karlsfeld, Klaus Schweitzer, ö Niederpöcking, Alex Rossmann, Karlsfeld, Fed. Rep. of Germany

[73] Assignee: Motoren- und Turbinen-Union Munchen GmbH, Munich, Fed. Rep. of Germany

[21] Appl. No.: 930,730

[22] Filed: Aug. 3, 1978

[30] Foreign Application Priority Data

Aug. 18, 1977 [DE] Fed. Rep. of Germany ....... 2737208

[51] Int. Cl.³ ...................... C04B 33/34; C04B 37/00
[52] U.S. Cl. ...................................... 264/62; 264/85; 264/101; 264/272
[58] Field of Search ................... 264/60, 61, 62, 272, 264/85, 82, 101

[56] References Cited

U.S. PATENT DOCUMENTS

| 3,505,158 | 4/1970 | Murray | 264/60 |
| 3,859,399 | 1/1975 | Bailey | 264/60 |
| 3,876,408 | 4/1975 | Geyer | 264/60 |

Primary Examiner—Donald J. Arnold
Attorney, Agent, or Firm—Scully, Scott, Murphy & Presser

[57] ABSTRACT

For encapsulating a ceramic molded member for high-temperature isostatic pressing (HIP), a generally porous coating of glass and/or ceramic is applied on the molded member of ceramic and sintered under a vacuum into a pressure-tight capsule encompassing the molded member.

11 Claims, No Drawings

METHOD FOR ENCAPSULATING A MOLDED CERAMIC MEMBER

BACKGROUND OF THE INVENTION

1. Field of the Invention

The present invention relates to a method for the encapsulation of a molded member of ceramic material, particularly a silicon ceramic for high-temperature isostatic pressing.

During hot or high-temperature isostatic pressing (HIP) porous molded members of silicon ceramic are compressed through the simultaneous application of high pressure on all sides thereof and of high temperature. By means of the high-temperature isostatic pressing there can be improved the mechanical strength at elevated temperature as well as resistance to oxidation through a reduction in the porosity of the molded member. The pressures employed during high-temperature isostatic pressing (HIP) lie in an order of magnitude of 3000 bar, with the temperature being about 1750° C. Normally, gas is utilized as a pressure transmitting medium. In order to prevent this gas from penetrating into the pores of the molded member, the molded member must be encapsulated in a pressure-tight manner.

2. Discussion of the Prior Art

Heretofore, this encapsulation has been effected in that the molded ceramic member is enclosed in an evacuated glass container, wherein the glass container becomes viscous during the high-temperature isostatic pressing and adheres to the molded ceramic member as a glass coating or layer.

In this known method of encapsulating the molded ceramic member there exists the danger at a too low viscosity of the glass container melting during the high-temperature isostatic pressing, the glass coating will penetrate into the pores of the molded member, and that there will occur a chemical reaction between the glass and the silicon ceramic of the molded member. This may impair the strength of the surface region of the molded member to an inadmissible extent. Furthermore, due to the excessive penetration of the highly fluid glass into the porosity of the molded member there may be produced such an intimate bond between the glass envelope and the molded member that upon the removal of the glass envelope after the high-temperature isostatic pressing, it may not be possible to avoid damaging of the molded ceramic members, particularly if they are of complicated, thin-walled configurations. On the other hand, there is also present the danger that at too high a viscosity of the glass container melting during the high-temperature isostatic pressing process and of the resultant glass coating adhering to the molded ceramic member, there can occur absolutely undesirable deformation of the molded ceramic member.

SUMMARY OF THE INVENTION

Accordingly, it is a primary object of the present invention to provide a method for the encapsulation of a molded member of ceramic, by means of which it is possible to achieve a pressure-tight encapsulation of the molded member without resulting in too intimate a bond between the capsule material and the material of the molded member while however, concurrently maintaining precisely, as far as is possible, the original geometric shape of the molded ceramic member.

It is a more specific object of the present invention to provide a method of the type described in which a generally porous layer or coating of glass and/or of a ceramic material is applied onto the molded member and sintered under a vacuum so as to form a pressure-tight capsule encompassing the molded member.

DETAILED DISCUSSION

Thusly, pursuant to the present invention, the material for the capsule layer is applied prior to the evacuation of the molded member. Because of the porosity of the applied layer, evacuation can be subsequently effectuated which, from the standpoint of the technical method, represents a considerable simplification.

Inasmuch as, in accordance with the inventive method, the pressure-tight encapsulation has already been completed prior to the commencement of the high-temperature isostatic pressing, the capsule material can be so selected that its viscosity itself will still remain so high at the extremely high temperatures and pressures encountered during the high-temperature isostatic pressing, that there is no need to fear any penetration into the pores of the molded ceramic member. On the other hand, the high viscosity of the capsule material during the high-temperature isostatic pressing poses no danger of an undesirable deformation of the molded ceramic member, since the capsule material has already been formed onto the molded ceramic member before the high-temperature isostatic pressing, and is merely compressed together with the latter. A further important advantage of the inventive method resides in that the encapsulation can be performed directly within the HIP press.

A further method according to the invention, equally evidencing the advantages just described and being adapted for encapsulating a molded member of reaction-sintered silicon ceramic, particularly of silicon nitride with excess silicon, such as silicon nitride ($Si_3N_4$) is inventively characterized in that a generally porous coating of glass and/or ceramic is applied on the molded member, the molded member is then evacuated and filled with nitrogen ($N_2$), and thereafter the coating is sintered into a pressure-tight capsule. During this process, the sintering of the applied porous coating takes place at normal pressure, whereby the nitrogen gas entrapped in the molded member reacts with the silicon so as to be converted into silicon nitride. Accordingly, the sintering process need not be carried out in a vacuum chamber.

As the glass powder there should, preferably, be employed $SiO_2$ glass, $SiO_2$-$B_2O_3$ glasses, or such glasses with components of MgO or $Al_2O_3$. The $B_2O_3$ components of such glasses can be in the range of from 2% to 15%.

Furthermore, in a preferred embodiment of the present invention it is proposed that the porous coating be constituted of Li-containing glass powder. In the utilization of Li-containing glasses, during the temperature increase during the sintering process there is an elevation in the melting point, for instance, due to recrystallization, so that hereby there is achieved a particularly high toughness by the capsule layer, and there is safely avoided the undesirable penetration of the coating into the porous molded member during high-temperature isostatic pressing.

Additionally, in a preferred embodiment of the inventive method, the porous coating is produced in a manner wherein a mixture of glass powder and an organic binding agent is applied on the molded member and that the porous coating is obtained by drying the thus coated molded member. The drying is effectuated at temperatures in the vicinity of about 300° C. Applicable as organic binding agents are preferably saturated alcoholic stearin solution, or aqueous gelatin pastes, or other plasticizers known in the glass sintering technology.

In a further preferred embodiment of the present invention, the porous coating is applied onto the molded member by thermal spraying. The temperature for sintering the porous coating preferably lies within the range of 700° to 1400° C., a temperature still sufficiently lying below the decomposition temperatures of silicon nitride. The preferred time for the compression sintering of the porous coating consists of approximately ½ to 2 hours.

Described hereinbelow is a preferred exemplary embodiment of the inventive method, as follows:

Initially, there is produced a mixture of $SiO_2$ glass powder and a binding agent constituted of a saturated alcoholic stearin acid solution and sprayed on the molded ceramic member. The applied coating is dried and the molded member thereafter introduced into a hot isostatic press. The pressing chamber is evacuated to a pressure $P < 10^{-2}$ Torr and subsequently heated to a temperature $T_1$ (approximately 1200° C.). During the heating the organic binding agent is expelled from the coating. Remaining is a powdery glass coating which encompasses the molded member. This coating is sintered dense during a period of from ½ to 2 hours after the temperature $T_1$ has been reached so as to form a closed gas-tight skin. After this period, the hot isostatic press is heated to the pressing temperature $T_2$ of approximately 1700° and the pressure in the hot isostatic press is raised up to 1000 to 3000 bars. The further sequence of the high-temperature isostatic pressing is effected in a usual manner.

What is claimed is:

1. In a method for encapsulating a molded member of silicon ceramic material for high-temperature isostatic pressing (HIP); the improvement comprising applying a generally porous coating of a member selected from the group consisting of glass and ceramic material on said molded member; and sintering said coating under a vacuum so as to form a pressure-tight capsule encompassing said molded member.

2. In a method for encapsulating a molded member of reaction-sintered silicon ceramic material, containing excess silicon; the improvement comprising applying a generally porous coating of a member selected from the group consisting of glass and/or a ceramic material on said molded member; evacuating said molded member; filling said molded member with nitrogen ($N_2$); and thereafter sintering said coating into a pressure-tight capsule.

3. Method as claimed in claim 1 or 2, said glass being constituted of a powder of a member selected from the group consisting of pure $SiO_2$ glass, $SiO_2$-$B_2O_3$ glasses and glasses having additions of MgO, $Al_2O_3$.

4. Method as claimed in claim 1 or 2, said porous coating being constituted of a lithium-containing glass powder.

5. Method as claimed in claim 1 or 2 comprising applying a mixture of glass powder and an organic binding agent on said molded member; and drying said coating to thereby produce said coated molded member.

6. Method as claimed in claim 1 or 2 comprising applying said porous coating on said molded member by thermal spraying.

7. Method as claimed in claim 5, said organic binding agent comprising a saturated alcoholic stearin solution.

8. Method as claimed in claim 5, said organic binding agent comprising an aqueous gelatin paste.

9. Method as claimed in claim 1 or claim 2, wherein the temperature for sintering said porous coating is in the range of about 700° to 1400° C.

10. Method as claimed in claim 1 or claim 2, wherein the time for sintering dense said porous coating is approximately ½ to 2 hours.

11. Method as claimed in claim 1 or claim 2, comprising performing said sintering dense in a hot isostatic press, said hot isostatic pressing (HIP) immediately following said sintering step.

* * * * *